(12) United States Patent
Renner

(10) Patent No.: US 9,463,798 B2
(45) Date of Patent: Oct. 11, 2016

(54) METHOD AND DEVICE FOR DETERMINING A LANE-ADAPTATION PARAMETER FOR A LANE-KEEPING SYSTEM OF A VEHICLE, AS WELL AS METHOD AND DEVICE FOR LANE GUIDANCE OF A VEHICLE

(71) Applicant: Robert Bosch GmbH, Stuttgart (DE)

(72) Inventor: Christian Renner, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/394,917

(22) PCT Filed: Apr. 15, 2013

(86) PCT No.: PCT/EP2013/057760
§ 371 (c)(1),
(2) Date: Oct. 16, 2014

(87) PCT Pub. No.: WO2013/156422
PCT Pub. Date: Oct. 24, 2013

(65) Prior Publication Data
US 2015/0088338 A1   Mar. 26, 2015

(30) Foreign Application Priority Data

Apr. 16, 2012   (DE) .................. 10 2012 206 211

(51) Int. Cl.
| | |
|---|---|
| *B60W 30/12* | (2006.01) |
| *B60T 7/22* | (2006.01) |
| *B60T 8/172* | (2006.01) |
| *B62D 15/02* | (2006.01) |
| *B60W 30/09* | (2012.01) |
| *G05D 1/02* | (2006.01) |

(52) U.S. Cl.
CPC ............. *B60W 30/12* (2013.01); *B60T 7/22* (2013.01); *B60T 8/172* (2013.01); *B60W 30/09* (2013.01); *B62D 15/026* (2013.01); *G05D 1/0246* (2013.01); *B60T 2201/022* (2013.01); *B60T 2201/08* (2013.01)

(58) Field of Classification Search
CPC ....... B60W 30/12; B60W 30/09; B60T 7/22; B60T 8/172; B60T 2201/08; B60T 2201/022; G05D 1/0246; B62D 15/026
USPC ........................................... 701/1
See application file for complete search history.

(56) References Cited

U.S. PATENT DOCUMENTS

| | | |
|---|---|---|
| 2010/0209892 A1 | 8/2010 | Lin et al. |
| 2011/0015805 A1 | 1/2011 | Seger |

FOREIGN PATENT DOCUMENTS

| | | |
|---|---|---|
| DE | 10 2007 050189 | 4/2009 |
| DE | 10 2008 003666 | 7/2009 |

(Continued)

*Primary Examiner* — Brian P Sweeney
(74) *Attorney, Agent, or Firm* — Norton Rose Fulbright US LLP

(57) ABSTRACT

A method for determining a lane-adaptation parameter for a lane-keeping system of a vehicle having at least one surround sensor. The method includes reading in, from a sensor signal from the at least one surround sensor, an obstacle-extension area of a visibility obstacle, caused by at least one vehicle driving in front, transversely to a course of a traffic lane on which the vehicle is to travel. The method also includes ascertaining the lane-adaptation parameter as a function of the read-in obstacle-extension area and a vehicle-extension area transversely to the course of the traffic lane in which the vehicle is to travel. The lane-adaptation parameter is determined so that when using the lane-adaptation parameter, the lane-keeping system is set up to reduce an overlap of the obstacle-extension area and the vehicle-extension area.

9 Claims, 2 Drawing Sheets

(56) References Cited

FOREIGN PATENT DOCUMENTS

| | | |
|---|---|---|
| DE | 10 2009 040677 | 3/2011 |
| DE | 10 2009 047333 | 6/2011 |
| EP | 2 314 490 | 4/2011 |
| EP | 2 388 757 | 11/2011 |
| JP | 2006 003995 | 1/2006 |
| JP | 2006 036076 | 2/2006 |
| JP | 2009 237938 | 10/2009 |

METHOD AND DEVICE FOR DETERMINING A LANE-ADAPTATION PARAMETER FOR A LANE-KEEPING SYSTEM OF A VEHICLE, AS WELL AS METHOD AND DEVICE FOR LANE GUIDANCE OF A VEHICLE

FIELD OF THE INVENTION

The present invention relates to a method for determining a lane-adaptation parameter for a lane-keeping system of a vehicle, to a method for lane guidance of a vehicle, a device for determining a lane-adaptation parameter for a lane-keeping system of a vehicle and/or for lane guidance of a vehicle, and a corresponding computer program product.

BACKGROUND INFORMATION

A lane-keeping system in a vehicle is able to offer steering assistance to a vehicle driver. More specifically, the vehicle can be kept on a trajectory within a detected lane via a moment on a steering wheel. A method for controlling a driver assistance system, and a driver assistance system are discussed in the German publication DE 10 2008 003 666 A1. The US publication 2010/0209892 A1 discusses a driving skill recognition on the basis of the manual transmission shift behavior.

SUMMARY OF THE INVENTION

Against this background, the present invention provides an improved method for determining a lane-adaptation parameter for a lane-keeping system of a vehicle, an improved method for lane guidance of a vehicle, an improved device for determining a lane-adaptation parameter for a lane-keeping system of a vehicle and/or for lane guidance of a vehicle, as well as an improved computer program product as recited in the main claims. Advantageous refinements are derived from the respective dependent claims and the following description.

The present invention provides a method for determining a lane-adaptation parameter for a lane-keeping system of a vehicle, the vehicle having at least one surround sensor and the method having the following steps:

Reading in, from a sensor signal of the at least one surround sensor, an obstacle-extension area of a visibility obstacle, caused by at least one vehicle driving in front, transversely to a course of a traffic lane in which the vehicle is to drive; and determining the lane-adaptation parameter as a function of the read-in obstacle-extension area and a vehicle-extension area transversely to the course of the traffic lane in which the vehicle is to travel. The lane-adaptation parameter is determined in such a way that the lane-keeping system when using the lane-adaptation parameter, is configured to reduce an overlap of the obstacle-extension area and the vehicle-extension area.

The vehicle may be a motor vehicle, especially a road-bound motor vehicle such as a passenger car, a truck or some other commercial vehicle. The vehicle is able to move along a traffic lane or travel in a traffic lane. The traffic lane may extend longitudinally to the driving route of the vehicle and have a width dimension or traffic lane width that runs transversely to the course of the traffic lane in which the vehicle is to travel. A first traffic lane boundary and a second traffic lane boundary may laterally delimit the traffic lane with respect to other traffic lanes or a road environment. Thus, the width dimension of the traffic lane may correspond to a shortest distance from the first traffic lane boundary to the second traffic lane boundary. The vehicle-extension area of the vehicle can correspond to a dimension of the vehicle transversely to the course of the traffic lane in which the vehicle is to travel, or to a width of the vehicle. The vehicle-extension area may include at least a section of the width dimension of the traffic lane or the traffic lane width. The lane-keeping system may include a system for detecting traffic lane markings present in the form of white or yellow lines, for example, based on at least one surround sensor, e.g., in the form of a monocular or stereo video camera, and steering assistance of the driver based thereon. Via a moment on a steering wheel, the vehicle is able to be kept within the confines of the detected lane. More specifically, in one development of a lane-keeping system, a centered guidance of the vehicle within the detected lane may typically be provided. The vehicle can be controlled to be situated in the center of the traffic lane or the traffic lane width.

The surround sensor could be a vehicle camera, for instance in the form of a still image camera and/or video camera, a radar sensor or the like. The vehicle camera may be equipped with an interface for outputting image information in the form of the sensor signal and, for example, be used to monitor the course of the traffic lane in which the vehicle is to travel, especially so as to detect a width and/or a boundary of the traffic lane to be used by the vehicle, and possibly a position of the vehicle in relation to a traffic lane width. The vehicle camera could include an image processing unit for processing image data acquired by a sensor of the vehicle camera. The visibility obstacle may include a material that was or is stirred up by the at least one vehicle driving in front, and include snow, water, dirt or the like. It may be situated, in the shape of a cloud, between the at least one vehicle driving in front and the vehicle. The obstacle-extension area of the visibility obstacle may correspond to a dimension of the visibility obstacle transversely to the course of the traffic lane in which the vehicle is to travel, or to a width of the visibility obstacle. The obstacle-extension area may encompass at least a subsection of the width dimension of the traffic lane or the traffic lane width.

The lane-adaptation parameter could be configured such that the lane-keeping system induces steering of the vehicle that reduces the overlap of the obstacle-extension area and the vehicle-extension area. The lane-adaptation parameter may be configured to adapt an input trajectory along which the lane-keeping system is to guide the vehicle within the confines of the traffic lane, in such a way that the overlap of the obstacle-extension area and the vehicle-extension area is reduced.

The present invention also creates a method for lane guidance of a vehicle, which has the following steps:

determining a lane-adaptation parameter according to a method indicated in the above text; and executing the lane guidance with the aid of the lane-adaptation parameter, in such a way that the overlap of the obstacle-extension area and the vehicle-extension area is reduced.

In conjunction with the above-mentioned method for lane guidance of a vehicle, it is advantageously possible to use or configure the aforementioned method for determining a lane-adaptation parameter for a lane-keeping system of a vehicle.

The present invention furthermore provides a device for determining a lane-adaptation parameter for a lane-keeping system of a vehicle and/or for lane guidance of a vehicle, the device being configured to execute or implement the steps of one of the previously mentioned methods. In particular, the device may include apparatuses which are set up to carry out one step of one of the above-mentioned methods in each case. This embodiment variant of the present invention in the form of a device may likewise be used to quickly and efficiently achieve the object on which the present invention is based.

In the case at hand, a device could be an electrical device or a control unit which receives sensor signals and outputs lane-adaption parameters or control signals based thereon to a lane-keeping or driver assistance system. The device may include an interface configured as hardware and/or software. In a hardware implementation, the interfaces may be part of a so-called system ASIC, for instance, which encompasses a wide variety of functionalities of the device. However, it is also possible for the interfaces to be self-contained, integrated switching circuits or to be at least partially made up of discrete components. In a software configuration, the interfaces may be software modules which are provided in a microcontroller in addition to other software modules, for example.

Also advantageous is a computer program product having program code that is stored on a machine-readable carrier such as a semiconductor memory, a hard-disk memory or an optical memory, and is used to implement one of the aforementioned methods when the program is running on a computer or a device.

According to specific embodiments of the present invention, especially an adaptation of the controlled lane keeping of a lane-keeping system for bypassing or avoiding a visibility obstruction caused by vehicles driving in front is provided. For example, this makes it possible to react to a certain situation, e.g., a situation encountered in cold weather countries, where, owing to stirred up particules such as dry snow, the vision of the driver is obstructed by vehicles driving in front, such that an advantageous adaptation of the lane guidance takes place, possibly including a deviation from the centered guidance. The at least one surround sensor provided in the vehicle for detecting traffic lanes, for example using a video camera, may be used to detect the afore-described situation and advantageously adapt the behavior of the lane guidance, especially in a parametric manner, according to specific embodiments of the present invention.

A rigidly specified guidance of the vehicle in the center of the traffic lane does not always reflect the behavior desired by the driver. A deviation from or an adaptation of the control to the left or right by the lane-adaptation parameter may lead to safe mastering of the situation in a scenario in which the visibility is obstructed. The available lane width is taken into account in the process. One advantage of the present invention is that it increases the driving safety because the method and the devices according to specific embodiments of the present invention are able to improve the driver's view of the road course. In addition to the driver, the visibility is also improved for the video camera because of a lane adaptation and the resulting circumvention of the region featuring obstructed visibility. The lane adaptation with the aid of the lane-adaptation parameter may advantageously also correspond to a lane position that a driver of a vehicle not equipped with a lane-keeping system would instinctively select under these circumstances. As a result, a lane-keeping system that is adapted or adaptable to visibility obstructions, especially obstructions attributable to driven snow and the like, is able to be created.

According to one specific embodiment of the determination method, the lane-adaptation parameter is able to be determined in the step of ascertaining the lane-adaptation parameters, with the aid of a lane width of the traffic lane, such that the lane-keeping system when using a lane-adaptation parameter is configured to induce an offset of the vehicle-extension area relative to the obstacle-extension area within the lane width of the traffic lane, and/or by an area of maximally one half of the lane width outside the traffic lane. The at least one surround sensor and/or an evaluation device assigned to the at least one surround sensor may be used to detect the lane width of the traffic lane. The offset of the vehicle-extension area relative to the obstacle-extension area may be an offset transversely to the course of the traffic lane. Such a specific development offers the advantage that the overlap of the vehicle-extension area and the obstacle-extension area is able to be reduced in a reliable manner with the aid of the offset and taking the lane width of the traffic lane into account.

In addition, a step may be provided for detecting the obstacle-extension area of the visibility obstacle, caused by the at least one vehicle driving in front, transversely to the course of the traffic lane in which the vehicle is to travel, utilizing the sensor signal from the at least one surround sensor. Such a specific embodiment offers the advantage that, based on a reliably and accurately detected or recorded obstacle-extension area as the data basis, the lane-adaptation parameter is thus able to be determined in a precise and reliable manner.

Furthermore, a step may be provided for reading in, from the sensor signal of the at least one surround sensor, the vehicle-extension area transversely to the course of the traffic lane in which the vehicle is to travel. To do so, at least one detected distance to a traffic lane boundary, for example, may be utilized for detecting the vehicle-extension area. Such a specific embodiment offers the advantage that at least the majority of the data for determining the lane-adaptation parameter is able to be obtained from the sensor signal, so that the lane-adaptation parameter is determined in an uncomplicated, reliable and efficient manner.

According to one specific embodiment of the method for lane guidance, in the lane-guidance execution step, a specified trajectory for the vehicle is able to be adapted as a function of the lane-adaptation parameter, such that the overlap of the obstacle-extension area and the vehicle-extension area is reduced when the vehicle is moving along the adapted specified trajectory. The specified trajectory represents a path along which the lane-keeping system is able to guide the vehicle inside the traffic lane or roadway in a controlled manner. Such a specific embodiment offers the advantage that even when a visibility obstruction is present, the lane guidance of the vehicle, using the specified trajectory adapted by the lane-adaptation parameter, is able to be implemented in a reliable manner, the visibility and the driving safety being increased or maintained.

In the step of implementing the lane guidance, it is also possible to adapt a specified trajectory for the vehicle as a function of the lane-adaptation parameter, so that the vehicle-extension area is shifted in the direction of a traffic lane boundary on the driver side. In the process, the specified trajectory may be shifted in the direction of the driver-side traffic lane boundary under the influence of the lane-adaptation parameter, so that a distance of the vehicle from the driver-side traffic lane boundary is reduced. Such a specific embodiment has the advantage of allowing a frequent scenario in road traffic to be taken into account. In this way, the driver's view is able to be improved in an especially effective manner in that the specified trajectory is shifted to the driver's side of the traffic lane.

The present invention is explained in greater detail with reference to the attached drawing.

DETAILED DESCRIPTION

Figure 1:
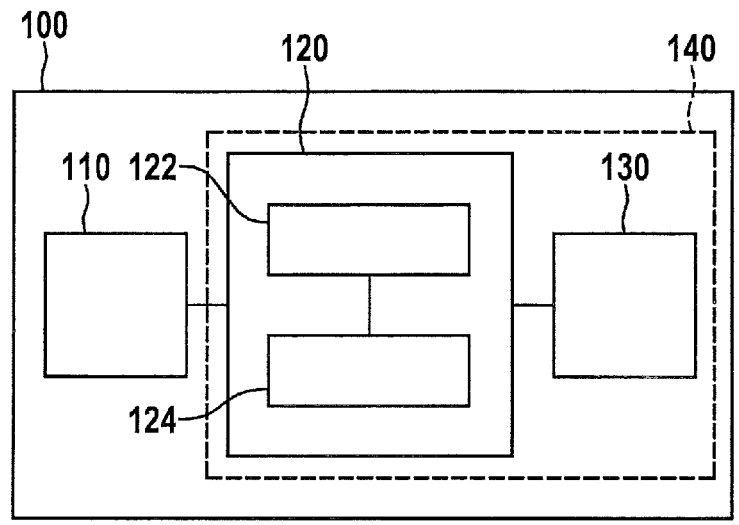
FIG. 1 is a schematic illustration of a vehicle having a device according to an exemplary embodiment of the present invention.

In the subsequent description of exemplary embodiments of the present invention, the same or similar reference numerals are used for the elements that are shown in the various figures and act similarly, so that a repeated description of these elements has been dispensed with.

FIG. 1 shows a schematic representation of a vehicle having a device according to an exemplary embodiment of the present invention. Shown are vehicle 100, a surround sensor 110, a determination device 120 having a read-in device 122 and an ascertainment apparatus 124, and a lane guidance device 130. Furthermore, a combined device 140 for ascertaining a lane-adaptation parameter for a lane-keeping system of a vehicle and for lane guidance of a vehicle is shown, which includes determination device 120 and lane guidance device 130 according to the exemplary embodiment of the present invention shown in FIG. 1.

In the exemplary embodiment of the invention shown in FIG. 1, surround sensor 110 includes a vehicle camera and an associated processing device for image information, even if this is not explicitly shown in FIG. 1. Surround sensor 110 is configured to monitor an environment of vehicle 100 in the direction of travel. Surround sensor 110 obtains image information about the course of a traffic lane in which vehicle 100 is to travel. Surround sensor 110 is furthermore configured to output the image information or the processed image information in the form of a sensor signal. According to another exemplary embodiment of the present invention, vehicle 100 may also have two or more surround sensors 110, which may be based on the same type of detection principle or on different types of detection principles.

Determination device 120 includes read-in device 122 and ascertainment apparatus 124. Determination device 120 receives the sensor signal from surround sensor 110. The lane-keeping system of vehicle 100 may include lane-guidance device 130. Determination device 120, surround sensor 110 or some other evaluation device may also be configured to analyze the sensor signal with regard to the visibility obstacle and its obstacle extension area. Determination device 120 furthermore is configured to determine a lane-adaptation parameter for a lane-keeping system of vehicle 100.

Read-in device 122 of determination device 120 is set up to read in, from the sensor signal received from surround sensor 110, an obstacle extension area of a visibility obstacle, caused by at least one vehicle traveling in front, transversely to a course of a traffic lane in which vehicle 100 is to travel. Ascertainment device 124 of determination device 120 is set up to ascertain a lane-adaptation parameter as a function of the read-in obstacle-extension area and a vehicle-extension area transversely to the course of the traffic lane in which vehicle 100 is to travel. The vehicle-extension area also is able to be read out or analyzed from the sensor signal. Ascertainment apparatus 124 is configured to ascertain the lane-adaptation parameter in such a way that the lane-keeping system of vehicle 100 when using the lane-adaptation parameter is configured to reduce an overlap of the obstacle-extension area and the vehicle-extension area.

Determination device 120 is configured to output the lane-adaptation parameter to lane-guidance device 130. Lane-guidance device 130 receives the lane-adaptation parameter from determination device 120. Furthermore, lane-guidance device 130 is set up to implement the lane guidance using the lane-adaptation parameter such that the overlap of the obstacle-extension area and the vehicle-extension area is reduced. Despite not being illustrated in this way in FIG. 1, in another exemplary embodiment of the present invention, determination device 120 may also be part of lane-guidance device 130 or the lane-keeping system.

Figure 2A:
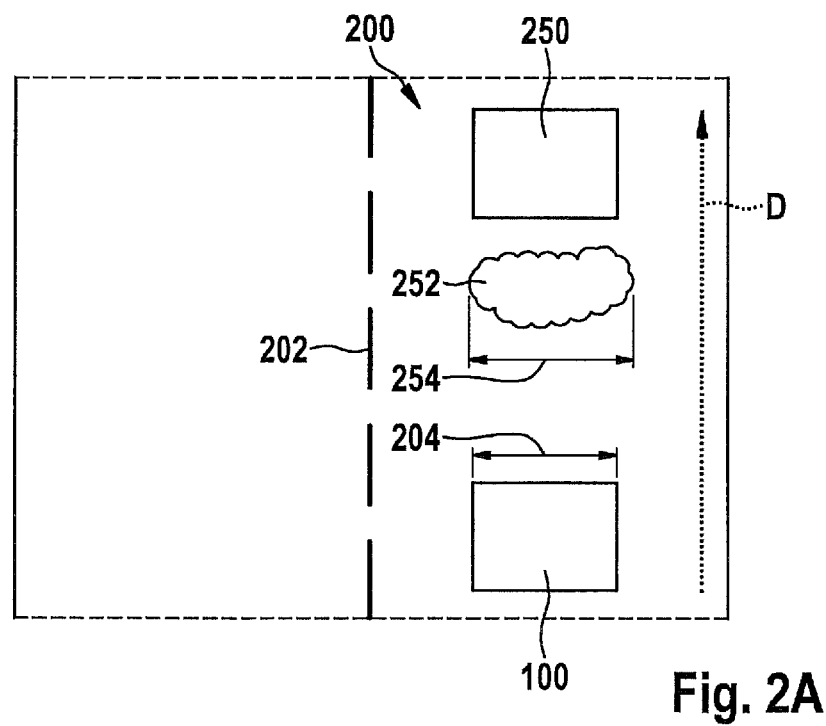
FIGS. 2A and 2B are schematic illustrations of a vehicle having a device according to an exemplary embodiment of the present invention, in a traffic situation.

FIG. 2A shows a schematic representation of a vehicle having a device according to an exemplary embodiment of the present invention, in a traffic situation. Shown are a vehicle 100, a traffic lane 200, a traffic lane boundary 202, a vehicle-extension area 204 of vehicle 100, a vehicle 250 traveling in front, a visibility obstacle 252, an obstacle-extension area 254, and a driving direction D. Vehicle 100 is the vehicle from FIG. 1.

Traffic lane 200, for example, is a directional traffic lane of a two-lane road. On a first side, traffic lane 200 is delimited by traffic lane boundary 202, e.g., in the form of a center stripe or the like. When viewed in driving direction D, traffic lane boundary 202 is a driver-side traffic lane boundary of traffic lane 200. On a second side, traffic lane 200 is delimited by a further traffic lane boundary, e.g., in the form of a road edge. Traffic lane 200 may have a lane width or width extension from traffic lane boundary 202 to the further traffic lane boundary. The width extension of traffic lane 200 runs transversely to driving direction D.

Vehicle 100 and vehicle 250 traveling in front move within traffic lane 200 in driving direction D. Preceding vehicle 250 is situated in front of vehicle 100. Vehicle-extension area 204 of vehicle 100 extends transversely to driving direction D. Vehicle-extension area 204 of vehicle 100 takes up a subsection of the width extension of traffic lane 200. In the exemplary embodiment of the present invention shown in FIG. 2A, vehicle 100 and vehicle 250 driving in front move in single file one behind the other, the distance of vehicle 100 to traffic lane boundary 202 corresponding to a distance of preceding vehicle 250 to traffic lane boundary 202 within a tolerance margin. The lane guidance device from FIG. 1 guides vehicle 100 on a specified trajectory within traffic lane 200.

Visibility obstacle 252 is situated between vehicle 100 and vehicle 250 traveling in front. Visibility obstacle 252 manifests itself as a particulate cloud of snow, water, dust, sand or the like, for example. Visibility obstacle 252 is caused by vehicle 250 driving in front. Thus, the particulate cloud has been raised by the vehicle 250 driving in front, for instance. Obstacle-extension area 254 of visibility obstruction 252 extends transversely to driving direction D. Obstacle-extension area 254 of visibility obstacle 252 includes a subsection of the width extension of traffic lane 200. According to the exemplary embodiment of the present invention shown in FIG. 2A, obstacle-extension area 254 and vehicle-extension area 204 overlap with regard to the width dimension or the width extension direction of traffic lane 200. In addition, obstacle-extension area 254 of visibility obstacle 252, for example, includes a larger subsection of the width extension of traffic lane 200 than vehicle-extension area 204 of vehicle 100.

Figure 2B:
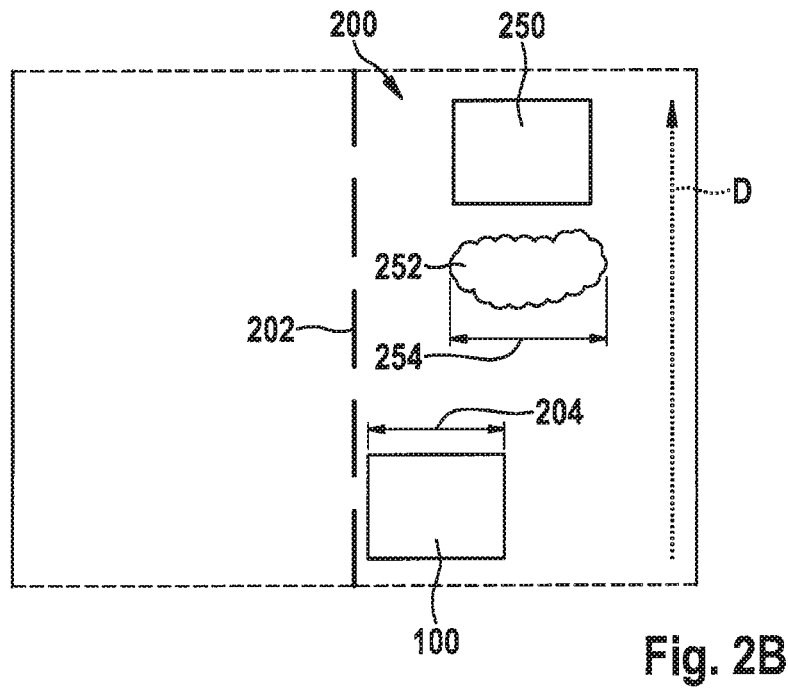

FIG. 2B shows a schematic representation of the vehicle or the traffic situation from FIG. 2A. The representation in FIG. 2B corresponds to the representation in FIG. 2A, with the exception that the distance of vehicle 100 from traffic lane boundary 202 is smaller than the distance of preceding vehicle 250 from traffic lane boundary 202. Such a reduced distance of vehicle 100 from traffic lane boundary 202 may stem from a possible reaction to visibility obstacle 252 by the combined device for determining a lane-adaptation parameter for a lane-keeping system and for lane guidance. According to the exemplary embodiment of the present invention shown in FIG. 2B, an overlap of obstacle-extension area 254 and vehicle-extension area 204 with regard to the width dimension or the width extension direction of traffic lane 200 is reduced.

Figure 3:
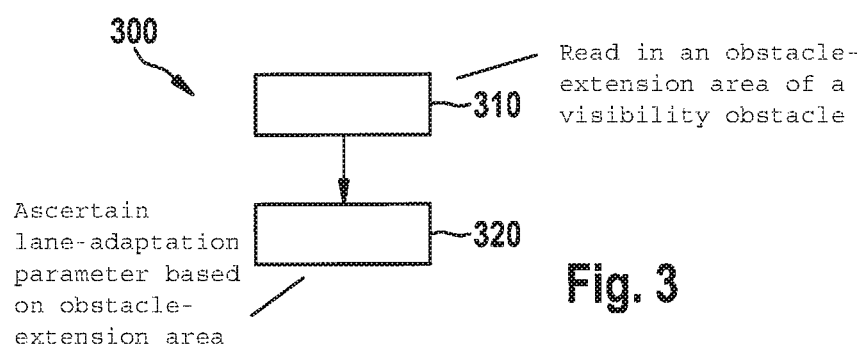
FIG. 3 is a flow chart of a determination method according to an exemplary embodiment of the present invention.

FIG. 3 shows a flow chart of a method 300 for determining a lane-adaptation parameter for a lane-keeping system of a vehicle in accordance with an exemplary embodiment of the present invention. The vehicle has at least one surround sensor. Method 300 includes a step 310 for reading in, from a sensor signal from the at least one surround sensor, an obstacle-extension area of a visibility obstacle, caused by at least one vehicle driving in front, transversely to a course of a traffic lane in which the vehicle is to travel. Method 300 also has a step 320 for ascertaining the lane-adaptation parameter as a function of the read-in obstacle-extension area and a vehicle-extension area transversely to the course of the traffic lane in which the vehicle is to travel. The lane-adaptation parameter is determined in such a way that the lane-keeping system when using the lane-adaptation parameter is set up to reduce an overlap of the obstacle-extension area and the vehicle-extension area. Method 300 shown in FIG. 3 may advantageously be realized in conjunction with a device, such as the combined device from FIG. 1, especially in conjunction with the determination device from FIG. 1.

Figure 4:
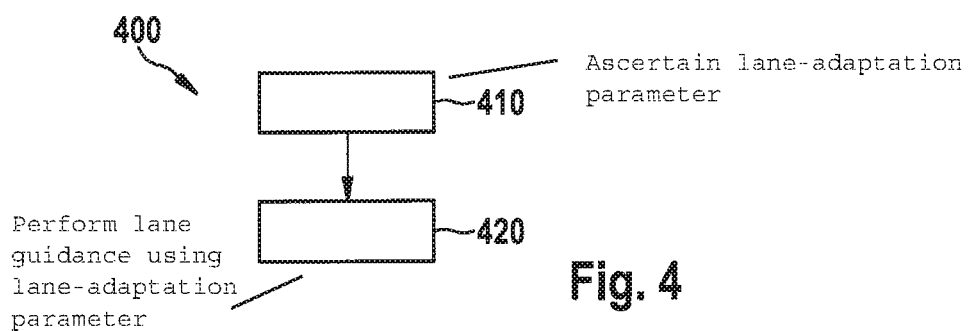
FIG. 4 is a flow chart of a method for lane guidance according to an exemplary embodiment of the present invention.

FIG. 4 shows a flow chart of a method 400 for lane guidance of a vehicle according to an exemplary embodiment of the present invention. Method 400 includes a step 410 for ascertaining a lane-adaptation parameter. The lane-adaptation parameter is ascertained by executing the method from FIG. 3. Method 400 also includes a step 420 of executing the lane guidance using the lane-adaptation parameter, in such a way that the overlap of the obstacle-extension area and the vehicle-extension area is reduced. Method 400 shown in FIG. 4 may advantageously be realized in conjunction with the method from FIG. 3, using a device such as the combined device from FIG. 1, especially in conjunction with the lane-guidance device from FIG. 1.

By executing the method from FIGS. 3 and 4, a lane guidance of a vehicle is able to respond to a visibility obstacle, as can be gathered from a comparison of FIGS. 2A and 2B.

The exemplary embodiments described and shown in the figures have been selected merely as examples. Different exemplary embodiments are combinable with one another, either completely or with regard to individual features. An exemplary embodiment may also be supplemented by features from another exemplary embodiment. In addition, it is possible to repeat method steps according to the present invention.

What is claimed is:

1. A method for providing automated lane guidance using a lane-keeping system of a vehicle having at least one surround sensor, the method comprising:
   reading in by the lane-keeping system, from a sensor signal from the at least one surround sensor, an obstacle-extension area of a visibility obstacle, caused by at least one vehicle driving in front, transversely to a course of a traffic lane in which the vehicle is to travel;
   determining, by the lane-keeping system, a lane-adaptation parameter as a function of the read-in obstacle-extension area and a vehicle-extension area transversely to the course of the traffic lane in which the vehicle is to travel, the lane-adaptation parameter being determined so that the lane-keeping system when using the lane-adaptation parameter is set up to reduce an overlap of the obstacle-extension area and the vehicle-extension area; and
   providing, by the lane-keeping system, automated lane guidance of the vehicle using the lane-adaptation parameter to reduce an overlap of the obstacle-extension area and the vehicle-extension area.

2. The method of claim 1, wherein in the determining, the lane-adaptation parameter is ascertained with a lane width of the traffic lane, so that the lane-keeping system when using the lane-adaptation parameter is set up to induce an offset of the vehicle-extension area relative to the obstacle-extension area within the lane width of the traffic lane, and/or about an area of maximally one half of the traffic lane width outside the traffic lane.

3. The method of claim 1, further comprising:
   detecting the obstacle-extension area of the visibility obstacle, caused by the at least one vehicle driving in front, transversely to the course of the traffic lane in which the vehicle is to travel, using the sensor signal from the at least one surround sensor.

4. The method of claim 1, further comprising:
   reading in the vehicle-extension area transversely to the course of the traffic lane in which the vehicle is to travel, from the sensor signal of the at least one surround sensor.

5. A method for providing automated lane guidance of a vehicle, the method comprising:
   determining, by the lane-keeping system, a lane-adaptation parameter for a lane-keeping system of a vehicle having at least one surround sensor, by performing the following:
      reading in by the lane-keeping system, from a sensor signal from the at least one surround sensor, an obstacle-extension area of a visibility obstacle, caused by at least one vehicle driving in front, transversely to a course of a traffic lane in which the vehicle is to travel; and
      determining, by the lane-keeping system, the lane-adaptation parameter as a function of the read-in obstacle-extension area and a vehicle-extension area transversely to the course of the traffic lane in which the vehicle is to travel, the lane-adaptation parameter being determined so that the lane-keeping system when using the lane-adaptation parameter is set up to reduce an overlap of the obstacle-extension area and the vehicle-extension area; and
   performing, by the lane-keeping system, the automated lane guidance using the lane-adaptation parameter, so that the overlap of the obstacle-extension area and the vehicle-extension area is reduced.

6. The method of claim 5, wherein in the executing of the lane guidance, a specified trajectory for the vehicle is adapted as a function of the lane-adaptation parameter, such that the overlap of the obstacle-extension area and the vehicle-extension area is reduced when the vehicle is moving along the adapted specified trajectory.

7. The method of claim 5, wherein in the executing of the lane guidance, a specified trajectory for the vehicle is adapted as a function of the lane-adaptation parameter, such that the vehicle-extension area is shifted in the direction of a driver-side traffic lane boundary.

8. A lane-keeping system of a vehicle having at least one surround sensor, comprising:
- a controller including a processor configured to provide automated lane guidance by performing the following:
  - reading in, from a sensor signal from the at least one surround sensor, an obstacle-extension area of a visibility obstacle, caused by at least one vehicle driving in front, transversely to a course of a traffic lane in which the vehicle is to travel;
  - determining a lane-adaptation parameter as a function of the read-in obstacle-extension area and a vehicle-extension area transversely to the course of the traffic lane in which the vehicle is to travel, the lane-adaptation parameter being determined so that the lane-keeping system when using the lane-adaptation parameter is set up to reduce an overlap of the obstacle-extension area and the vehicle-extension; and
  - providing automated lane guidance of the vehicle using the lane-adaptation parameter to reduce an overlap of the obstacle-extension area and the vehicle-extension area.

9. A non-transitory computer readable medium having a computer program, which is executable by a processor, comprising:
- a program code arrangement having program code which, when executed by the processor, performs a method for providing automated lane guidance using a lane-keeping system of a vehicle having at least one surround sensor, the method comprising:
  - reading in by the lane-keeping system, from a sensor signal from the at least one surround sensor, an obstacle-extension area of a visibility obstacle, caused by at least one vehicle driving in front, transversely to a course of a traffic lane in which the vehicle is to travel;
  - determining, by the lane-keeping system, a lane-adaptation parameter as a function of the read-in obstacle-extension area and a vehicle-extension area transversely to the course of the traffic lane in which the vehicle is to travel, the lane-adaptation parameter being determined so that the lane-keeping system when using the lane-adaptation parameter is set up to reduce an overlap of the obstacle-extension area and the vehicle-extension area; and
  - providing, by the lane-keeping system, automated lane guidance of the vehicle using the lane-adaptation parameter to reduce an overlap of the obstacle-extension area and the vehicle-extension area.

* * * * *